(12) United States Patent
Garcia

(10) Patent No.: US 9,348,324 B2
(45) Date of Patent: May 24, 2016

(54) CONTROLLING A WIND POWER PLANT TRANSFORMER

(75) Inventor: Jorge Martinez Garcia, Aarhus N (DK)

(73) Assignee: Vestas Wind Systems A/S, Aarhus N. (DK)

(*) Notice: Subject to any disclaimer, the term of this patent is extended or adjusted under 35 U.S.C. 154(b) by 533 days.

(21) Appl. No.: 13/807,489

(22) PCT Filed: Jun. 29, 2011

(86) PCT No.: PCT/DK2011/050251
§ 371 (c)(1),
(2), (4) Date: Dec. 28, 2012

(87) PCT Pub. No.: WO2012/000515
PCT Pub. Date: Jan. 5, 2012

(65) Prior Publication Data
US 2013/0116841 A1 May 9, 2013

Related U.S. Application Data

(60) Provisional application No. 61/360,101, filed on Jun. 30, 2010.

(30) Foreign Application Priority Data

Jun. 30, 2010 (DK) .................................. 2010 00574

(51) Int. Cl.
| | | |
|---|---|---|
| H02J 3/12 | (2006.01) | |
| G05B 11/01 | (2006.01) | |
| H02J 3/18 | (2006.01) | |
| H02P 9/00 | (2006.01) | |
| H02J 3/38 | (2006.01) | |
| H02P 101/15 | (2015.01) | |

(52) U.S. Cl.
CPC .............. *G05B 11/01* (2013.01); *H02J 3/1878* (2013.01); *H02P 9/008* (2013.01); *H02J 3/386* (2013.01); *H02P 2101/15* (2015.01); *Y02E 10/763* (2013.01); *Y02E 40/30* (2013.01)

(58) Field of Classification Search
CPC ...... Y02E 10/723; Y02E 10/72; Y02E 10/763; Y02E 40/30; Y02E 10/725; F03D 7/048; F03D 9/003; G05B 11/01; H02P 9/008; H02P 2101/15; H02P 2009/004; H02J 3/1878; H02J 3/386
USPC ............................................. 700/287; 290/44
See application file for complete search history.

(56) References Cited

U.S. PATENT DOCUMENTS

| | | | | |
|---|---|---|---|---|
| 5,541,498 | A | * | 7/1996 | Beckwith ....................... 323/211 |
| 6,924,565 | B2 | * | 8/2005 | Wilkins et al. .................. 290/44 |
| 2003/0122528 | A1 | * | 7/2003 | Iyoda et al. .................... 323/207 |
| 2007/0090811 | A1 | * | 4/2007 | Labuschagne ................ 323/217 |

FOREIGN PATENT DOCUMENTS

| | | |
|---|---|---|
| EP | 1508951 A1 | 2/2005 |
| EP | 1933441 A1 | 6/2008 |

OTHER PUBLICATIONS

Calovic Milan S., "Modeling and Analysis of Under-load Tap-changing Transformer Control Systems", Jul. 1984, IEEE vol. PAS-103 No. 7, 1909-1915.*
Jorge Martinez et al: "Design and coordination of a capacitor and on-load tap changer system for voltage control in a wind power plant of doubly fed induction generator wind turbines", Wind Energy, May 26, 2011, pp. N/A-N/A, XP55018583, ISSN: 1095-4244, DOI: 10.1002/We.474.
International Search Report, PCT/DK2011/050251, Feb. 22, 2012.

* cited by examiner

*Primary Examiner* — Kenneth M Lo
*Assistant Examiner* — Alan Chu
(74) *Attorney, Agent, or Firm* — Patterson + Sheridan, LLP

(57) ABSTRACT

A method for controlling a pilot signal (Ps) to a WPPT with an adjustable coil ratio, wherein the primary side of the transformer is connected to a plurality of WTGs and a variable reactive compensation load, the method comprising the steps of receiving an actual primary-side voltage ($V_{MV}$), receiving an actual primary-side current ($I_{QMV}$), estimating a line drop voltage ($D_V$) on the basis of the compensation current ($I_{QC}$) and the actual primary-side current ($I_{QMV}$), forming a voltage error (Verr) as the sum of a rated voltage value ($V_R$) and the estimated line drop voltage ($D_V$) minus the actual primary-side voltage ($V_{MV}$), namely: $V_{err}=V_R+D_V-V_{MV}$, and updating the pilot signal (Ps) in accordance with the voltage error ($V_{err}$).

20 Claims, 5 Drawing Sheets

CONTROLLING A WIND POWER PLANT TRANSFORMER

TECHNICAL FIELD OF THE INVENTION

The present invention generally relates to electricity generation and more particularly to a method and device for an improved control of the voltage generated by wind turbine generators.

BACKGROUND OF THE INVENTION

Wind power generation, wherein wind energy is converted into electricity, is constantly increasing as a power source. Representing a highly environmentally friendly alternative to other energy sources, wind power plants (WPPs), wherein wind turbine generators (WTGs) are agglomerated, are currently being developed and erected in numerous countries, both off-shore, onshore, and in the inland.

Although requirements for the connection of WPPs to the electrical grid may vary, common aims include permitting the development, maintenance and operation of a coordinated, reliable and economical transmission of electricity. However, as wind may frequently change both its direction and magnitude, the generated voltage from WTGs may be erratic. As an example, different wind speeds are translated into different active power generation levels, thus having different voltage levels for different wind speeds.

To compensate for an undesired fluctuation in the voltage supply and to counteract disturbances in the energy generation such as voltage sags, swells and momentary interruptions, reactive power equipment may be installed in the WPP. This equipment may for example include static compensators if the dynamic properties of the WPP are to be improved, switchable capacitors if the requirement is related to steady-state performance, or the equipment may comprise a combination of both static and switchable compensators.

The voltage from the WTGs and the reactive power equipment which is to be supplied to the grid is often transformed by a WPP transformer (WPPT). However, to counteract voltage disturbances in the power supply, there is a wish to improve the control of the WPPT such that grid requirements are fulfilled regarding the supplied electricity. However, such a control may be difficult to achieve, notably due to the number of WTGs being large and/or the reactive power equipment impact on the WPP.

Furthermore, if the voltage on the primary side of the WPPT is unstable—and possibly the voltage at the WTG terminals is too—the performance of an independent control of the voltage to be supplied to the electricity grid may deteriorate.

SUMMARY OF THE INVENTION

In view of the above, an object of the present invention is to provide an improved control of the WPPT.

According to the present invention, this is realized by a method for controlling a pilot signal ($P_S$) to a WPPT with an adjustable coil ratio, wherein the primary side of the transformer is connected to a plurality of WTGs and a variable reactive compensation load, the method comprising the steps of receiving an actual primary-side voltage ($V_{MV}$), receiving an actual primary-side current ($I_{QMV}$), estimating a line drop voltage ($D_V$) on the basis of a compensation current ($I_{QC}$) and the actual primary-side current ($I_{QMV}$), forming a voltage error ($V_{err}$) as the sum of the rated voltage value ($V_R$) and the estimated line drop voltage ($D_V$) minus the actual primary-side voltage ($V_{MV}$), namely: $V_{err}=V_R+D_V-V_{MV}$, and updating the pilot signal ($P_S$) in accordance with the voltage error ($V_{err}$).

Thus, the method of the present invention determines the pilot signal by monitoring an error signal including a line drop voltage $D_V$ over a fictitious impedance of the connection of the WTGs to the WPPT. Thus, the WTG terminals are maintained at a suitable voltage near the nominal value. Here, $D_V$ is estimated on the basis of the compensation current $I_{QC}$ from the variable reactive compensation load and $I_{QMV}$. The voltage error $V_{err}$, which is to be minimized, is equal to the rated voltage value $V_R$ added by $D_V$ and subtracted by the actual primary-side voltage $V_{MV}$. By including $D_V$ and $I_{QC}$ in the controlling of the pilot signal $P_S$, i.e. including the characteristics of the (remote) WTGs and the variable reactive compensation load, an improved control of the WPPT is achieved. As a consequence, the deviance of the WTG terminal voltage from their nominal value may be decreased, and as a further consequence, the voltage supplied to the electricity grid by the WPP may more closely follow the desired voltage of the electricity grid.

By the term "pilot signal", it is here meant the output control signal which is updated by $V_{err}$ i.e. the output control signal which is to actuate the WPPT. Furthermore, by the term "coil ratio", it is meant the ratio between the windings of a primary side and a secondary side of the WPPT, so that a change of the WPPT coil ratio with other parameters unchanged implies a change of the transformed voltage.

The primary side of the WPPT is connected to a plurality of WTGs. However, the connection between the primary side of the WPPT and plurality of WTGs may be realized in many ways. As an example, one or several transformers may be provided between a WTG and the WPPT to transform the voltage generated by the WTG before the voltage is further transformed at the WPPT. Furthermore, a bus-bar may be realized, with connection points for each of the WTGs for collecting the generated electricity and conducting it to the WPPT. The bus-bar voltage is generally lower than the grid voltage, but suitably higher than that immediately output from a WTG.

The primary side of the WPPT may also be connected to a variable reactive compensation load. The variable reactive compensation load may comprise reactive elements such as e.g. capacitors, wherein the variable reactive compensation load compensates for e.g. WTG disturbances in the energy generation and also improves the power factor. The variable reactive compensation load may be connected to a bus-bar as outlined above. It is an important motivation of the present inventions that the compensation current has not as yet been possible to predict or estimate in a reliable fashion. This in turn has made automatic transformer control more delicate.

The method of the present invention further comprises the step of receiving an actual primary-side voltage $V_{MV}$, i.e. the voltage potential at the primary side of the WPPT. As an example, the voltage $V_{MV}$ may be obtained by a voltmeter connected to the primary side of the WPPT.

The method further comprises the step of receiving an actual primary-side current $I_{QMV}$, wherein the current $I_{QMV}$ may e.g. be received by an ammeter connected to the primary side of the WPPT.

As noted, the method further comprises the step of estimating a line drop voltage $D_V$ on the basis of the compensation current $I_{QC}$ and the actual primary-side current $I_{QMV}$. More precisely, if the variable reactive compensation load and the plurality of WTGs are connected to a common point (e.g. the bus-bar), the current from the plurality of the WTGs may be computed by Kirchhoff's current law by subtracting the actual primary-side current $I_{QMV}$ from the compensation current $I_{QC}$, i.e. $I_{QC}-I_{QMV}$. The line drop voltage $D_V$ may then be calculated as $U=Z_W \cdot I$ with $D_V=Z_W \cdot (I_{QC}-I_{QMV})$, wherein $Z_W$ denotes an impedance to be specified below. Thus, the line drop voltage ($D_V$) is estimated by computing the voltage across the impedance $Z_W$ which may be construed as a fictitious impedance.

The main impedance between the plurality of WTGs and the WPPT is due to one or several transformers connected to said plurality of WTGs. The WTG impedances may be modeled as an aggregated impedance, and this impedance may in its turn be modeled by an impedance coefficient. The impedance coefficient should be chosen in order to give the pilot signal $P_S$ to the WPPT beneficial properties. An excessively large impedance $Z_W$ may give the pilot signal $P_S$ an undesirably large amplitude, causing too brusque actuation of the WPPT, and a too low impedance $Z_W$ may lead to slow or insufficient control.

The method further comprises forming a voltage error $V_{err}$ for the control of the pilot signal $P_S$, by summing contributing voltages over a circuit segment. The voltage error vanishes when the voltage $V_{MV}$ minus the drop voltage $D_V$ coincide with the rated voltage $V_R$.

In other words, the voltage error $V_{err}$ is computed as the sum of the rated voltage value $V_R$ and the estimated line drop voltage $D_V$ minus the actual primary-side voltage $V_{MV}$, namely: $V_{err}=V_R+D_V-V_{MV}$.

The method further comprises updating the pilot signal $P_S$ in accordance with the voltage error $V_{err}$. By the terms "in accordance with" in this context, it is meant that the pilot signal $P_S$ is updated as a function of the voltage error $V_{err}$ by conventional automatic control principles. As one example, if the voltage error $V_{err}$ is equal to zero as a result of applying a given $P_S$ value, then the pilot signal $P_S$ should remain unchanged, such that the adjustable coil ratio of the WPPT is not changed but maintains the rated voltage value $V_R$ plus the drop voltage $D_V$ at the primary side of the transformer. However, if the voltage error $V_{err}$ is not equal to zero, the adjustable coil ratio of the WPPT may be changed to increase or decrease the coil ratio, and consequently, increase or decrease the voltage supplied to the electricity grid, so as to counteract the voltage error $V_{err}$.

According to one aspect, the method further comprises measuring the compensation current $I_{QC}$. As an example, measuring the compensation current $I_{QC}$ may be performed by arranging an ammeter in the connection line through which the compensation current $I_{QC}$ flows from the compensation load.

According to one aspect, the method further comprises estimating a compensation current $I_{QC}$ on the basis of the actual reactive compensation load $Z_V$ and the actual primary-side voltage $V_{MV}$. Thus, from the voltage $V_{MV}$ and the load $Z_V$, the actual compensation current $I_{QC}$ may be estimated. As an example, if the actual reactive compensation load $Z_V$ comprises several capacitors arranged in parallel, and the voltage drop over them is $V_{MV}$, the current $I_{QC}$ may be estimated as the summation of the individual capacitor currents: $I_n=V_{MV}/(1/(j\omega C_n))=j(\omega C_n) \cdot V_{MV}$, wherein j is the imaginary unit, $\omega$ is the angular frequency, and $C_n$ is the capacitance of the capacitor number n. Hence the amplitude will be $\omega C_n$ times that of $V_{MV}$, and the phase lag will be $\pi/2$.

According to one aspect, the variable reactive compensation load is controllable by a supervisory control and data acquisition system (e.g., SCADA), and the compensation current $I_{QC}$ is computed on the basis of an actual value of the reactive compensation load $Z_V$ received from the SCADA.

Thus, the variable reactive compensation load is communicatively connected to the SCADA such that the system may selectively control the variable reactive compensation load. As an example, if the variable reactive compensation load comprises a plurality of capacitive elements connected in parallel, the SCADA may switch in or switch out each of these.

The SCADA may interface with different wireless or wired communication media, e.g. an Ethernet network, and may support standard protocols to interface any third-party software. An advantage with the SCADA is the concentration of several functionalities in one central communication gateway, reducing the number of required communication lines to higher control levels. In the WPP, the SCADA may be communicatively connected to the WPPT such that the SCADA receives information e.g. about the coil ratio of the WPPT. The SCADA and the WPPT and/or the SCADA and the reactive compensation load may be connected by a wireless connection or by cable connection.

It should be noted that if static compensators STATCOM are comprised in the WPP, the compensation current $I_{QC}$ may be computed not only dependent on the reactive compensation load, but also on properties of the static compensators.

According to one aspect, the step of estimating the line drop voltage $D_V$ comprises estimating the line drop voltage $D_V$ by a multiple of the difference of the compensation current $I_{QC}$ and the actual primary-side current ($I_{QMV}$), namely: $D_V=(I_{QMV}-I_{QC}) \cdot K_L$, wherein $K_L$ is an impedance coefficient. As an example, the impedance coefficient $K_L$ may be a function of one or several variables related to e.g. the size and/or positioning of the plurality of WTGs and/or transformers connected to the plurality of WTGs. Alternatively, $K_L$ may be varied by an operator of the WPP so as to compensate observed inadequacies in the WTTP control. $K_L$ could be positive or negative according to the sign convention for reactive power injection. In the present disclosure, the capacitive current injection from the WPP is considered positive, therefore $K_L$ should be negative. Preferably, $K_L$ is a constant negative coefficient determined on the basis of the impedance of the transformer connected to the plurality of WTGs, an approximation motivated by the fact that this impedance is the largest impedance between the plurality of WTGs and the bus bar. Accordingly, $K_L$ represents a constant impedance chosen for the purpose of estimating the line drop voltage $D_V$.

Alternatively, the impedance coefficient $K_L$ is set to a first value $K_{L1}$ if the WPPT secondary-side voltage at the point of common coupling (PCC) is in the range of 0.90-0.95 p.u. (per-unit), a second value $K_{L2}$ if the WPPT secondary side voltage is in the range of 0.95-1.05 p.u., and a third value $K_{L3}$ if the WPPT secondary-side voltage is in the range of 1.05-1.10 p.u. This allows the characteristics of the feedback control to be varied in accordance with the changing dynamics of the system as well as design requirements. For instance, a different control strategy may be deemed suitable for large errors than for small fluctuations, as larger errors may have further-reaching consequences on the components of the electric system. Despite this enhanced configurability, the controller will observe and attend to the voltage error in a completely linear manner within each interval, thereby preserving the robustness, analyzability and other benefits of linear control. As the skilled person will readily understand, more than three intervals with separately configurable impedance coefficients may be provided, to achieve an even more adaptable control behavior.

According to one aspect, the variable reactive compensation load comprises a plurality of reactive elements which are arranged in parallel and are individually connectable by switches to the primary side of the transformer. Thus, the reactive elements, which may be capacitors, preferably of a high-voltage type, may be connectable by switches to the primary side of the WPPT such that the capacitive contribution to the primary side of the WPPT may be regulated by an operation of the respective switches. It has been discussed above how the compensation current can be computed on the basis of the actual primary-side current in such a configuration.

According to one aspect, the pilot signal ($P_S$) directly governs the coil ratio between the primary side and the secondary side of the transformer. Thus, the coil ratio of the WPPT may be changed in accordance with the pilot signal ($P_S$). Advantageously, this is taken into consideration in the provision of automatic control for the transformer. To reduce mechanical wear and other negative consequences of too frequent actuation, it is important to form an error signal that correctly reflects the state of the system. Choosing a well informed error signal, as by the present invention, avoids the dilemma in prior art of having to choose between too slow control and excessive wear.

As an example, if the voltage error $V_{err}$, to which value the pilot signal $P_S$ corresponds, is zero, or possibly, lies within a dead-band such as a small range close to the zero value, the adjustable coil ratio of the WPPT is not changed, in order to maintain the actual voltage at the primary side of the transformer. However, if the voltage error $V_{err}$ is not zero, or possibly, lies outside the dead-band, the pilot signal $P_S$ may actuate a change in the adjustable coil ratio of the WPPT, and consequently, increase or decrease the gridto-bus-bar voltage ratio.

Furthermore, the pilot signal $P_S$ may be processed by a timer which determines the duration of the voltage error exceeding the dead-band. The timer may be incremented if the voltage error $V_{err}$, in accordance to which the pilot signal $P_S$ is updated, is outside the dead-band. When the timer reaches a specific time, an increase or decrease of the pilot signal $P_S$, dependent on whether the voltage error $V_{err}$ is above or below the dead-band, may be commanded, and the timer may be reset. One purpose of such a delaying timer is to reduce wear of the equipment.

Analogously, the timer may be reset and/or blocked if the voltage error $V_{err}$ is within the dead-band due to smooth system dynamics or a tap change. The operation of the timer may also be blocked in cases that the voltage error $V_{err}$ falls below a defined limit and/or when the voltage error $V_{err}$ exceeds a defined limit.

According to one aspect, the pilot signal $P_S$ actuates a tap changer arranged in the transformer for governing the coil ratio between the primary side and the secondary side of the transformer. In other words, the pilot signal $P_S$ may actuate a reconnection to a different connection point tap along the transformer winding that allows a different number of turns of the transformer winding to be selected. As an example, the tap changer may be an on-load tap changer (OLTC), changing the winding on the secondary side of the WPPT. In order to achieve, independently of the wind speed and grid load, a controlled WTG terminal voltage the pilot signal $P_S$ actuates the tap changer to govern the WPPT coil ratio. Preferably the voltage at the WTG terminals is close to the nominal value and, if possible, vary only to a small extent.

An important requirement for the tap changer is that the desired voltage is maintained while reducing the frequency of operations to the lowest possible, thereby mitigating component wear and/or minimizing energy consumption.

Updating the pilot signal $P_S$ may furthermore include a delay by a predetermined period of any variation in the pilot signal that the voltage error necessitates. An advantage of this is that the delay is used to prevent unnecessary tap changes in response to transient voltage variations or self-correcting voltage variations. As an example, a pilot signal $P_S$ that oscillates steadily would cause incessant adjustments to the coil ratio of the WPPT according to this oscillation. However, as this is often undesired and consecutive adjustments tend to cancel out, the delay may advantageously avoid such variations.

Another advantage associated with the predetermined delay is that a desired time delay may be provided before any adjustment of the coil ratio of the WPPT is actuated by the pilot signal $P_S$. As an example, the time delay may be a function of time such that the time delay for the first tap change is longer than for consequent tap changes.

According to the present invention, there is provided a controller for generating a pilot signal $P_S$ to a WPPT with an adjustable coil ratio and its primary side being connected to a plurality of WTGs and a variable reactive compensation load. The controller comprises a current estimator for estimating a compensation current $I_{QC}$ on the basis of the actual reactive compensation load $Z_V$ and a primary-side voltage $V_{MV}$, a line drop voltage estimator communicatively coupled to the current estimator, for estimating a line drop voltage $D_V$ on the basis of a compensation current $I_{QC}$, a weighted summer communicatively coupled to the current estimator, for computing a voltage error $V_{err}$ as the difference between, on the one hand, the sum of the rated voltage value $V_R$ and the drop voltage $D_V$ and, on the other hand, the actual primary-side voltage $V_{MV}$, and a feedback controller communicatively coupled to the weighted summer, for generating a pilot signal P. The feedback controller is adapted to maintain the voltage error $V_{err}$ at zero by adjusting the pilot signal $P_S$.

According to the present invention, there is provided a computer program product including a computer-readable medium storing computer-readable instructions for carrying out the method of any one of claims 1 to 8.

According to the present invention, there is provided a self-regulating wind power plant transformer system, comprising a wind power plant transformer with an adjustable coil ratio, and a controller.

The discussion above relating to the method of the present invention is in applicable parts also relevant to the controller, the computer program product, and the WPPT system of the present invention. Hence, reference is made to that discussion.

Other objectives, features and advantages of the present invention will become apparent from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated. Features from two or more embodiments outlined above can be combined, unless they are clearly complementary, in further embodiments. The fact that two features are recited in different claim does not preclude that they can be combined to advantage. Likewise, further embodiments can also be provided the omission of certain features that are not necessary or not essential for the desired purpose.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, on which like references will be used for like elements.

DETAILED DESCRIPTION

Figure 1:
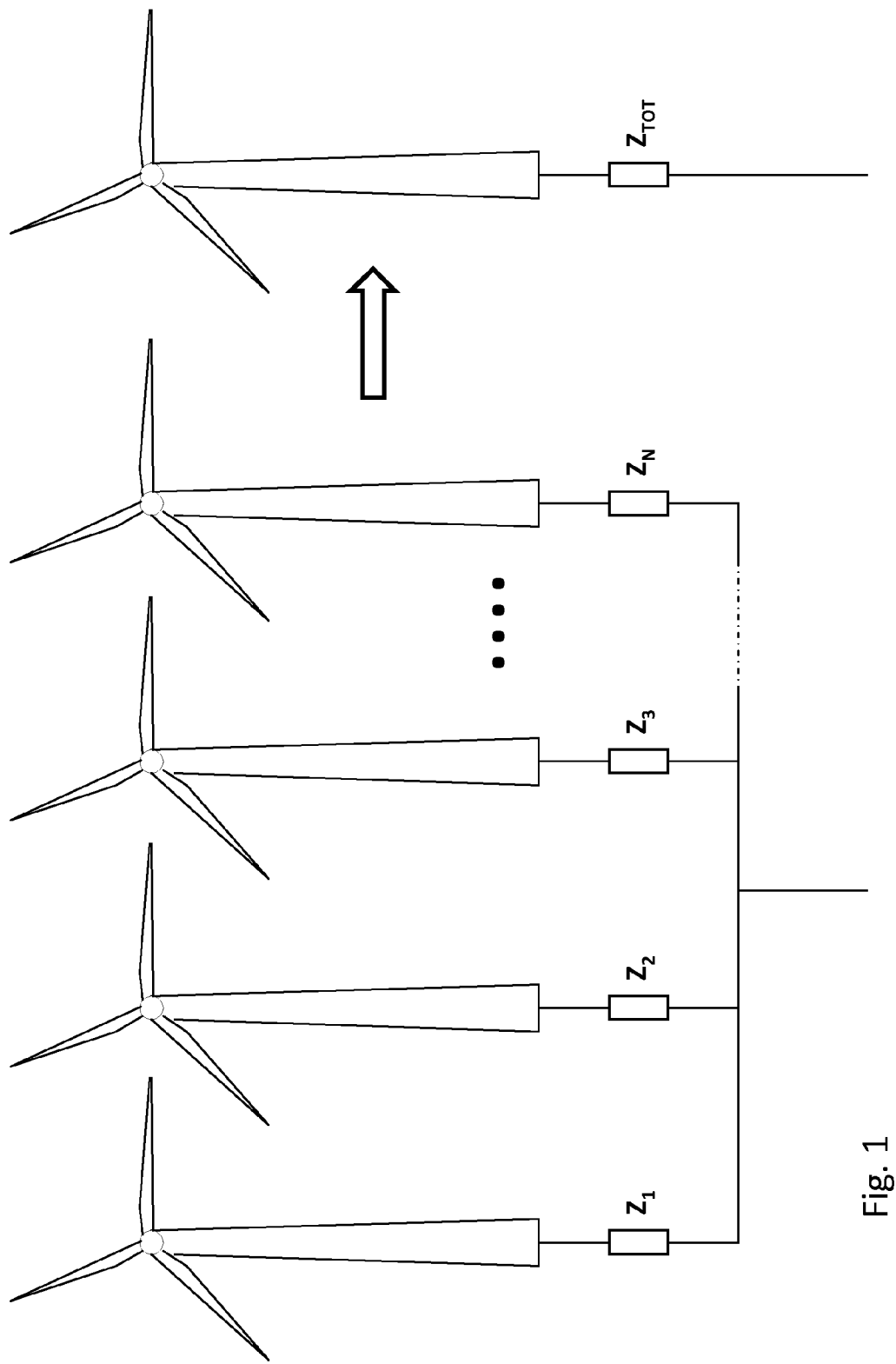
FIG. 1 is a schematic view of a wind power plant of the present invention.

FIG. 1 is a schematic representation of a plurality of WTGs in a WPP for generating electricity from kinetic energy in wind. Each WTG is associated with an impedance $Z_j$, wherein this impedance should be construed as the load connected to the WTG such as e.g. cables and transformers, i.e. a load which may for example be resistive, inductive and/or capacitive. The plurality of WTGs in the WPP are schematically connected, in parallel, to a common cable. Hence, the impedances $Z_1, Z_2, Z_3, \ldots, Z_N$ of said plurality of WTGs are connected in parallel.

By techniques which are known per se in the art, this plurality of WTGs in the WPP may also be modeled as one aggregated WTG, shown to the right in FIG. 1. Here, the impedance elements $Z_1, Z_2, Z_3, \ldots, Z_N$ arranged in parallel correspond to the equivalent impedance $Z_{TOT}$. Likewise, the aggregated WTG will be deemed to possess properties that are aggregated, in a well-defined manner, from the constituent WTGs in the plant. In this way, the accumulated load from the plurality of WTGs may be modeled as a total impedance for all WTGs in the WPP.

Figure 2:
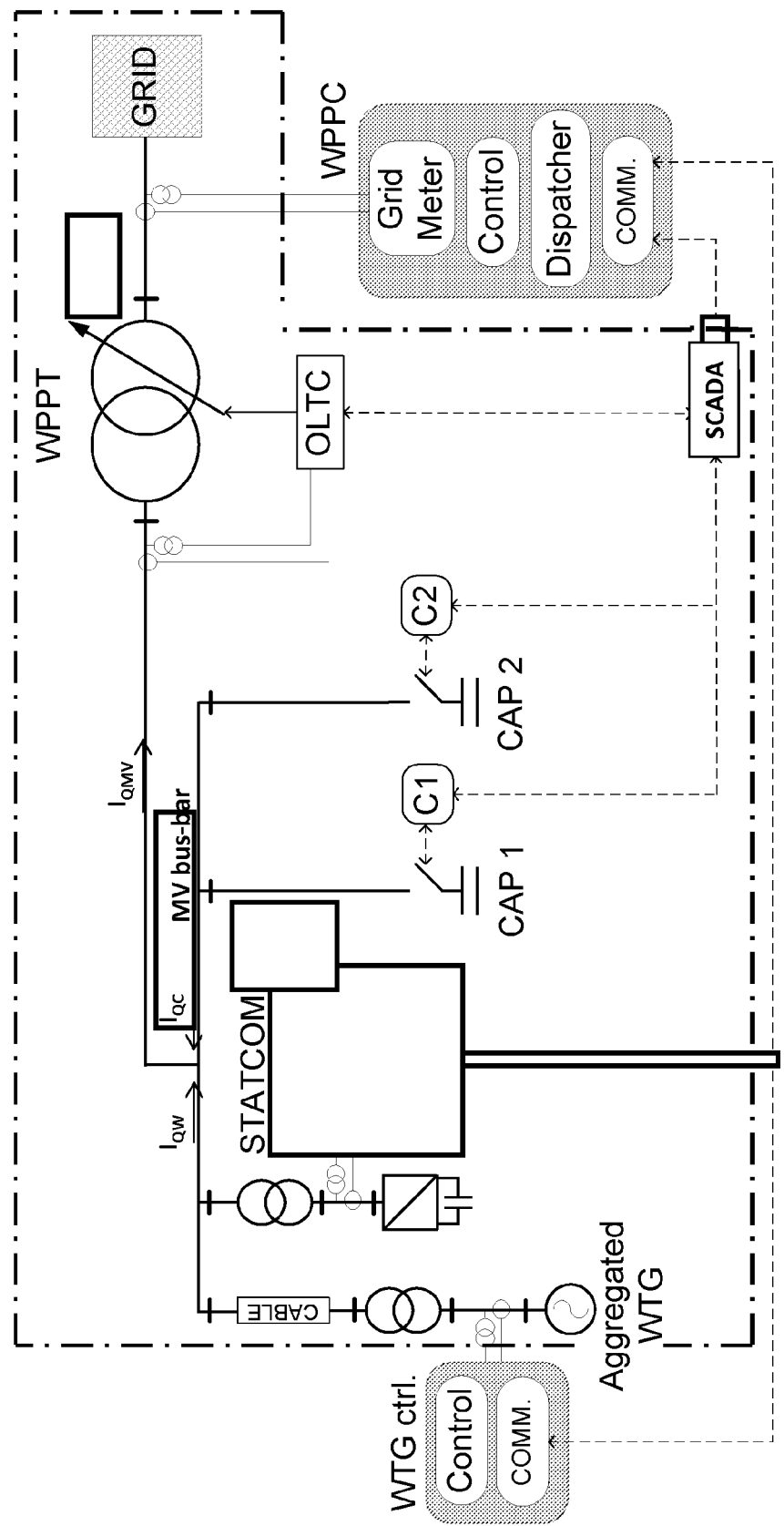
FIG. 2 is a schematic view of a circuitry of a wind power plant of the present invention.

FIG. 2 shows a schematic circuitry model of a WPP, wherein the dashdotted line separates an inner reactive power/voltage control loop, located at a WTG level, and an outer voltage control loop, controlled by a wind power plant controller (WPPC).

Describing the inner reactive power/voltage control loop, the aggregated WTG of the WPP as modeled in FIG. 1 is shown in the bottom left hand corner. Connected to the aggregated WTG is a transformer, denoted by two partially overlapping circles, and a cable, schematically shown as a resistor. The transformer and the cable may be construed as the total impedance $Z_{TOT}$ as shown in FIG. 1.

The aggregated WTG and the transformer are connected by the cable to a medium-voltage (MV) bus-bar. Furthermore, a static compensator (STATCOM) is connected to the MV bus-bar, in parallel with the aggregated WTG, the STATCOM being a reactive power equipment for enabling a static capability of the WPP.

Connected in parallel with the aggregated WTG and the STATCOM to the MV bus-bar are two capacitive elements also arranged in parallel, CAP 1 and CAP 2. The purpose of the capacitive elements is, inter alia, to compensate for electricity grid requirements not fulfilled by the plurality of WTGs alone, and to counteract disturbances in the energy generation. This capacitive compensation load, shown here as two capacitive elements CAP 1 and CAP 2, is schematically depicted, i.e. a manifold of variations of the capacitive element configuration are feasible, e.g. regarding the number of elements and/or the arrangement of their connection to the MV bus-bar.

The MV bus-bar is connected to a primary side of a transformer WPPT of the WPP, the WPPT being depicted as two big overlapping circles. The WPPT windings on the secondary side are adjustable by an on-load tap changer (OLTC) connected to the WPPT. More specifically, the OLTC may change the connection point tap along the transformer winding, which allows a certain number of turns of the transformer winding to be selected. Hence, the coil ratio of the WPPT is adjustable, meaning that the OLTC may change the voltage ratio between the primary side of the WPPT and the secondary side of the WPPT. On the secondary side of the WPPT, the transformer is connected to the electricity grid (GRID).

The OLTC is communicatively connected to a supervisory control and data acquisition system (SCADA), the system receiving information e.g. about the coil ratio of the WPPT. The communication between the SCADA and the WPPT and/or the SCADA and the reactive compensation load may be provided by a wireless connection or by cable connection. Furthermore, the SCADA is connected to switches C1 and C2, the switches connecting or disconnecting capacitive elements CAP 1 and CAP 2, respectively. Thus, the capacitive elements are connected to a SCADA through switches, such that the SCADA may selectively control the connection of CAP 1 and CAP 2 to the MV bus-bar in the WPP.

Variations in the bus-bar potential will cause a compensation current $I_{QC}$ to flow from the capacitive elements CAP 1 and CAP 2 to their connecting point at the MV bus-bar. Also conducted to the MV bus-bar is a current $I_{QW}$ from the aggregated WTG and the STATCOM. In the connecting point of the MV bus-bar, the two currents are added into a MV current, $I_{QMV}$, flowing to the primary side of the transformer WPPT of the WPP. In a simplified analysis, it may be assumed that the entire bus-bar is at equal potential.

Hence, FIG. 2 shows a circuitry wherein the compensation current $I_{QC}$ is added to the current $I_{QW}$ from the WTGs and the STATCOM, and wherein the combined current $I_{QMV}$ is conducted to the primary side of the WPPT. Based on the currents, the OLTC regulates the secondary side of the WPPT, and communicates with the SCADA which regulates the capacitive load, consequently changing the $I_{QC}$, and so on. To further simplify the circuit analysis, in a manner sufficient for designing and running an adequate control system, one may ignore all real currents and only study the imaginary components, as indicated by the index Q consistently used in the notation.

Figure 3:
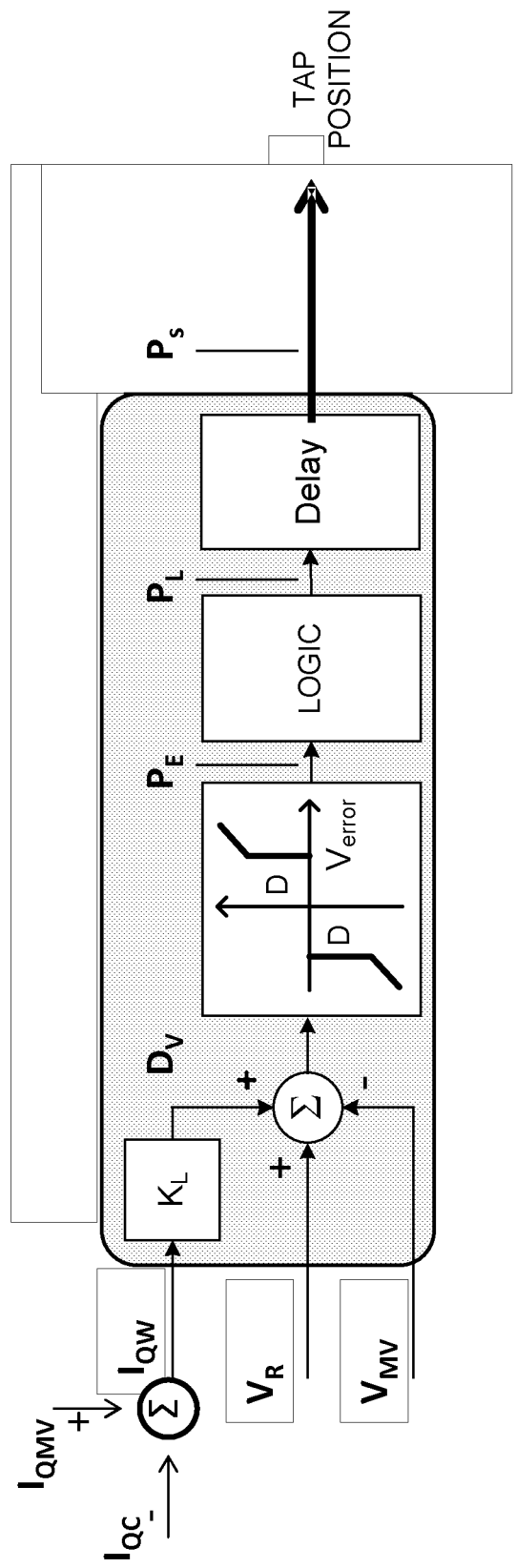
FIG. 3 is a schematic view of the controller of the present invention.

FIG. 3 is a schematic view of the controller of the present invention. A first weighted summer Σ is provided in the left-hand part of the figure, adding the MV current $I_{QMV}$ conducted to the primary side of the transformer WPPT and subtracting the compensation current $I_{QC}$ from the capacitive elements CAP 1 and CAP 2. The output of the first weighted summer Σ, $I_{QW}=I_{QMV}-I_{QC}$, is the current which according to the model flows from the aggregated WTG and the STATCOM. As the resistance of the transformer and the cables of the aggregated WTG and/or from the STATCOM in some cases may be neglected in comparison with the $I_{QC}$, the current $I_{QW}$ may be calculated without the contribution from the resistance. However, this feature may be added as an improvement to a more accurate control.

Furthermore, the current $I_{QW}$ is multiplied by a negative impedance coefficient $K_L$, wherein $K_L$ is based on the impedance $Z_W$ of the aggregated WTG. Multiplying the current $I_{QW}$ with the impedance coefficient $K_L$ yields a voltage $D_V$ which is taken to model the voltage drop due to the impedance between the bus-bar and the terminal of the aggregated WTG.

A rated voltage $V_R$ is added to a second weighted summer $\Sigma$. The drop voltage $D_V$ is added and an actual primary-side voltage $V_{MV}$ is subtracted in the weighted summer $\Sigma$, such that a voltage error $V_{err}$ is found as $V_{err}=V_R+D_V-V_{MV}$.

In this embodiment, the voltage error $V_{err}$ is supplied to a filter applying a dead-band $-D \leq V_{err} \leq D$. If the voltage error $V_{err}$ is within the dead-band D, the output $P_E$ of the dead-band filter is zero. However, if the voltage error $V_{err}$ is outside the dead-band, the output $P_E$ is nonzero, which will eventually increase or decrease the coil ratio, and consequently, increase or decrease the voltage ratio.

It should be noted that the transfer function of the dead-band filter is depicted schematically, i.e. the dead-band may be shifted and/or increased or decreased along the error axis, the behavior outside the dead-band may instead be non-linear etc.

In this embodiment, furthermore, the signal $P_E$ may be processed by a timer in the LOGIC function with output signal $P_L$, the timer determining the duration of the voltage error exceeding the dead-band. The timer may be incremented if the voltage error $V_{err}$, with which the signal $P_E$ is updated, is outside the dead-band. When the timer reaches a specific time, an increase or decrease of the signal $P_E$, dependent on if the voltage error $V_{err}$ is above or below the dead-band, is commanded, and the timer is reset.

Analogously, the timer may be reset and/or blocked if the voltage error $V_{err}$ is within the dead-band due to stable dynamics or a tap change. The operation of the timer may also be blocked in cases that the voltage error $V_{err}$ falls below a defined limit and/or when the voltage error $V_{err}$ exceeds a predefined limit.

Furthermore, a DELAY function is included, delaying any variation in the input signal $P_L$ that the voltage error necessitates. An advantage of this aspect is that the delay is used to prevent unnecessary tap changes in response to transient voltage variations or self-correcting voltage variations. The delaying functionality in the LOGIC section and the dedicated DELAY stage process the dead-band filter output in different ways and may, in variations to this embodiment, be applied singly.

The output of the rightmost block is the tap position of the WPPT, i.e. the pilot signal $P_S$ actuating the tap position. By this, the coil ratio may be adjusted, thereby changing the voltage ratio.

In practical circumstances, the constant $K_L$ appearing in the expression used for estimating the voltage drop $D_V$ may be determined by experimentation within the skilled person's capabilities. More precisely, by tuning the feedback controller while monitoring the behavior of the tap changer during normal operation of the WPP, including normal grid transients and wind fluctuations, a suitable range for $K_L$ can be identified. By a rule of thumb, which may serve as a starting point for the fine tuning, $K_L$ is related to the line impedance $Z_W$ between the bus bar and the (aggregated) WTG by a constant multiplicative factor, namely $K_L$ is within 2 and 20% of the wind power plant base impedance, preferably between 5 and 12% of the wind power plant base impedance and most preferably between 7 and 9% of the wind power plant base impedance. This rule may be used for designing a WPPT controller for a WPP system of the kind depicted in FIG. 2, and may need to be adapted to provide satisfactory guidance in respect of systems having a different layout or comprising different components.

Figure 4:
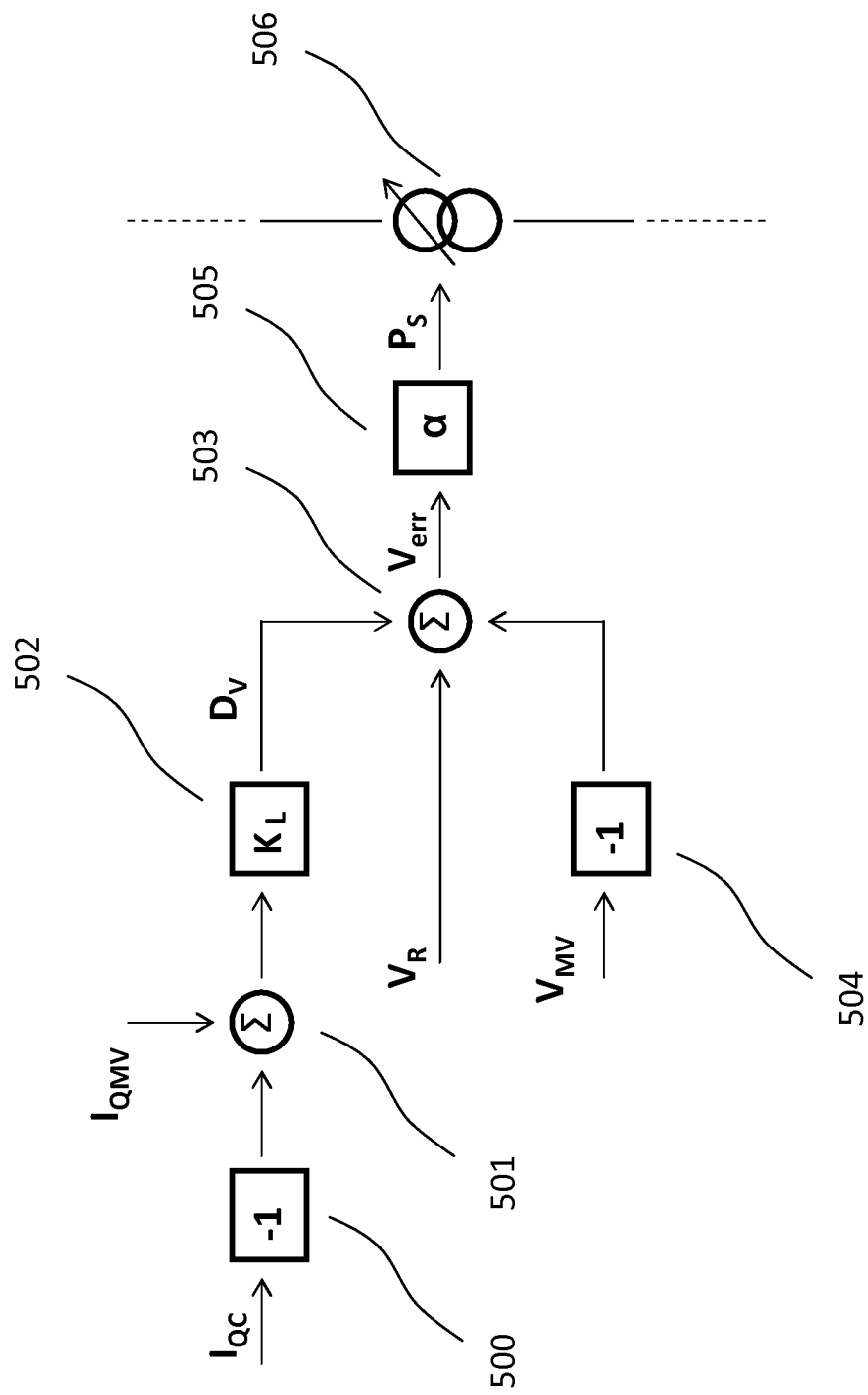
FIG. 4 shows a simplified, schematic embodiment of a controller according to the present invention.

FIG. 4 shows a simplified embodiment of a controller according to the present invention. A first summer 501 receives as inputs compensation current $I_{QC}$, which is weighted by an amplifier 500 of factor −1, and MV current $I_{QMV}$. The output of summer 501 is supplied to amplifier 502 with amplifying factor $K_L$, wherein $K_L<0$ is an impedance coefficient. The output of 502 becomes $K_L \cdot (I_{QC}-I_{QMV})$, being the estimate of the line drop voltage $D_V$.

A second summer 503 receives the output $K_L \cdot (I_{QC}-I_{QMV})$ of amplifier 502, the rated voltage $V_R$, and the actual primary-side voltage $V_{MV}$, the latter weighted by an amplifier 504 of factor −1. The summer 503 sums the contributions to the voltage error $V_{err}=V_R+K_L \cdot (I_{QC}-I_{QMV})-V_{MV}$, which is to be minimized.

Furthermore, the voltage error $V_{err}$ is weighted by an amplifier 505 of factor $\alpha$, thereby generating the pilot signal $P_S$ being the output of amplifier 505. The pilot signal $P_S$ actuates the WPPT 506 in order to maintain a desired primary-side value being the rated voltage value $V_R$ plus the voltage drop $D_V$. Clearly, the control system including the computation of the pilot signal is completely linear in this example.

Figure 5:
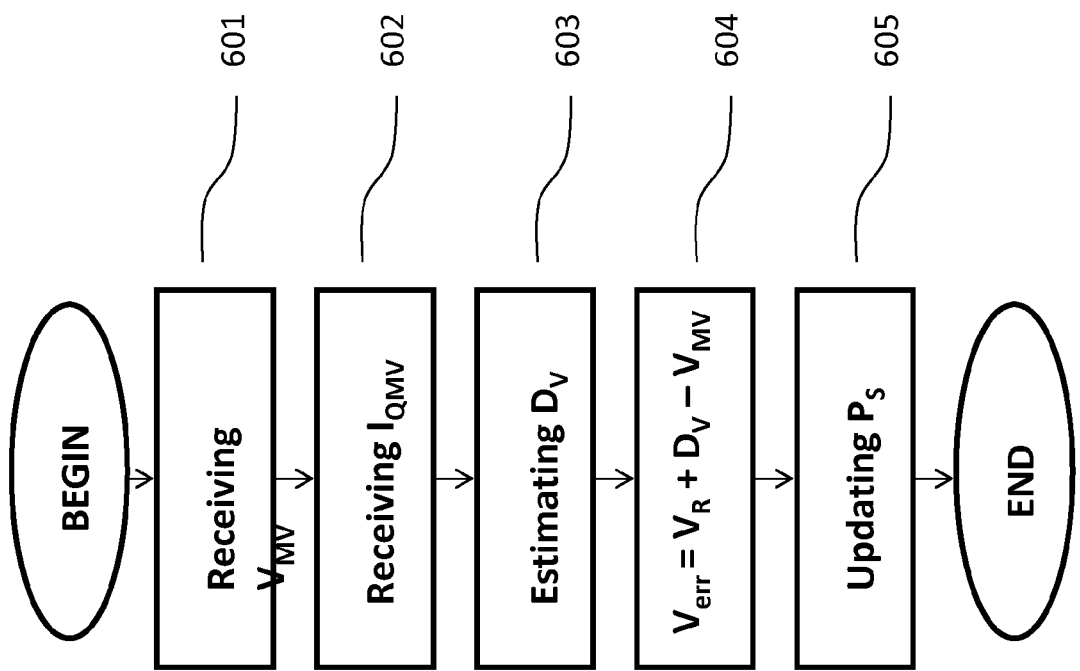
FIG. 5 is a flowchart of the method of the present invention.

FIG. 5 is a flowchart of a method according to an embodiment of the invention. The flowchart starts at block 601, wherein an actual primary-side voltage ($V_{MV}$) is received. Further, in block 602, an actual primary-side current ($I_{QMV}$) is received. Further, in block 603, a line drop voltage ($D_V$) is estimated on the basis of a compensation current ($I_{QC}$) and the actual primary-side current ($I_{QMV}$). Further, in block 604, a voltage error ($V_{err}$) is formed as the rated voltage value ($V_R$) plus the estimated line drop voltage ($D_V$) and minus the actual primary-side voltage ($V_{MV}$), namely: $V_{err}=V_R+D_V-V_{MV}$. Eventually, in block 605, the pilot signal ($P_S$) is updated in accordance with the voltage error ($V_{err}$). The method can be executed by a programmable computer or a dedicated firmware circuit.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling a wind power plant transformer having an adjustable coil ratio, a primary side of the wind power plant transformer operatively coupled with a plurality of wind turbine generators (WTGs) and a variable reactive compensation load, the method comprising:
   determining a current at the primary side of the wind power plant transformer;
   determining, using both the determined current and a compensation current provided by the variable reactive compensation load, a line drop voltage across one or more components coupled between the plurality of WTGs and the primary side of the wind power plant transformer;
   determining a voltage error based on a rated voltage value corresponding to at least one of the plurality of WTGs, the determined line drop voltage, and a voltage at the primary side of the wind power plant transformer; and
   generating a control signal for the wind power plant transformer based on the determined voltage error.

2. The method of claim 1, further comprising measuring the compensation current.

3. The method of claim 1, further comprising estimating the compensation current based on an impedance of the variable reactive compensation load and the voltage at the primary side of the wind power plant transformer.

4. The method of claim 1, wherein the variable reactive compensation load is controllable by a supervisory control and data acquisition system (SCADA), and wherein the compensation current is based on an impedance of the variable reactive compensation load received from the SCADA.

5. The method of claim 1, wherein determining the line drop voltage comprises estimating the line drop voltage based on a difference of the compensation current and the determined current at the primary side of the wind power plant transformer.

6. The method of claim 5, wherein estimating the line drop voltage is performed by multiplying, by a determined impedance coefficient, the difference of the compensation current and the determined current at the primary side of the wind power plant transformer.

7. The method of claim 1, wherein the variable reactive compensation load comprises a plurality of reactive elements arranged in parallel, each of the plurality of reactive elements being selectively connectable to the primary side of the wind power plant transformer via a respective switch.

8. The method of claim 1, wherein the control signal governs the coil ratio between the primary side and a secondary side of the wind power plant transformer.

9. The method of claim 8, wherein the control signal actuates a tap changer arranged in the wind power plant transformer for governing the coil ratio between the primary side and the secondary side of the wind power plant transformer.

10. The method of claim 1, wherein the voltage error is determined as a sum of the rated voltage value and the determined line drop voltage, minus the voltage at the primary side of the wind power plant transformer.

11. The method of claim 1, wherein the determined line drop voltage corresponds to a voltage drop across a transformer coupled with the plurality of WTGs, and a cable coupling the transformer with the wind power plant transformer.

12. The method of claim 1, wherein determining the line drop voltage is based on a determined impedance coefficient.

13. The method of claim 12, wherein the determined impedance coefficient varies based on a voltage at a secondary side of the wind power plant transformer.

14. A computer program product including a non-transitory computer-readable medium storing computer-readable instructions for controlling a wind power plant (WPP) transformer having an adjustable coil ratio, the WPP transformer coupled with a plurality of wind turbine generators (WTGs), the instructions configured to perform an operation comprising:
 determining a current at a primary side of the WPP transformer;
 determining, using both the determined current and a compensation current provided by a variable reactive compensation load coupled with the primary side of the WPP transformer, a line drop voltage across one or more components coupled between the plurality of WTGs and the primary side of the WPP transformer;
 determining a voltage error based on a rated voltage value corresponding to at least one of the plurality of WTGs, the determined line drop voltage, and a voltage at the primary side of the WPP transformer; and
 generating a control signal for the WPP transformer based on the determined voltage error.

15. A controller for a wind power plant (WPP) transformer having an adjustable coil ratio, a primary side of the WPP transformer operatively coupled with a plurality of wind turbine generators (WTGs) and a variable reactive compensation load, the controller comprising:
 a current estimator configured to estimate a compensation current provided by the variable reactive compensation load;
 a line drop voltage estimator communicatively coupled with the current estimator and configured to estimate, using both the estimated compensation current and a determined current at the primary side of the WPP transformer, a line drop voltage across one or more components coupled between the plurality of WTGs and the primary side of the WPP transformer;
 a weighted summer communicatively coupled with the current estimator and configured to determine a voltage error based on a rated voltage value corresponding to at least one of the plurality of WTGs, the determined line drop voltage, and a voltage at the primary side of the WPP transformer; and
 a feedback controller communicatively coupled with the weighted summer and configured to generate a control signal for the WPP transformer based on the determined voltage error.

16. The controller of claim 15,
 wherein the controller is coupled with a supervisory control and data acquisition system (SCADA) configured to control the variable reactive compensation load, and
 wherein the current estimator is configured to estimate the compensation current based on an impedance of the variable reactive compensation load received from the SCADA.

17. The controller of claim 15, wherein the line drop voltage estimator comprises an amplifier configured to receive an input signal comprising a difference of the estimated compensation current and a current at the primary side of the WPP transformer, wherein the amplifier has a gain of a determined impedance coefficient.

18. The controller of claim 15, wherein application of the control signal governs the coil ratio between the primary side and a secondary side of the WPP transformer.

19. The controller of claim 18, wherein application of the control signal actuates a tap changer arranged in the WPP transformer for governing the coil ratio between the primary side and the secondary side of the WPP transformer.

20. A self-regulating wind power plant transformer system, comprising:
 a wind power plant transformer having an adjustable coil ratio, and
 the controller of claim 15.

* * * * *